Nov. 27, 1956 R. H. SHENK ET AL 2,771,794
REVERSIBLE REDUCTION TRANSMISSION
Filed Nov. 20, 1952 5 Sheets-Sheet 1

INVENTOR.
Paul Edward Pontius
Robert H. Shenk
BY
Charles L. Lovenbach
Atty.

INVENTOR.
Paul Edward Pontius
Robert H. Shenk
BY Charles L. Lovercheck
Atty.

Nov. 27, 1956  R. H. SHENK ET AL  2,771,794
REVERSIBLE REDUCTION TRANSMISSION
Filed Nov. 20, 1952  5 Sheets-Sheet 3
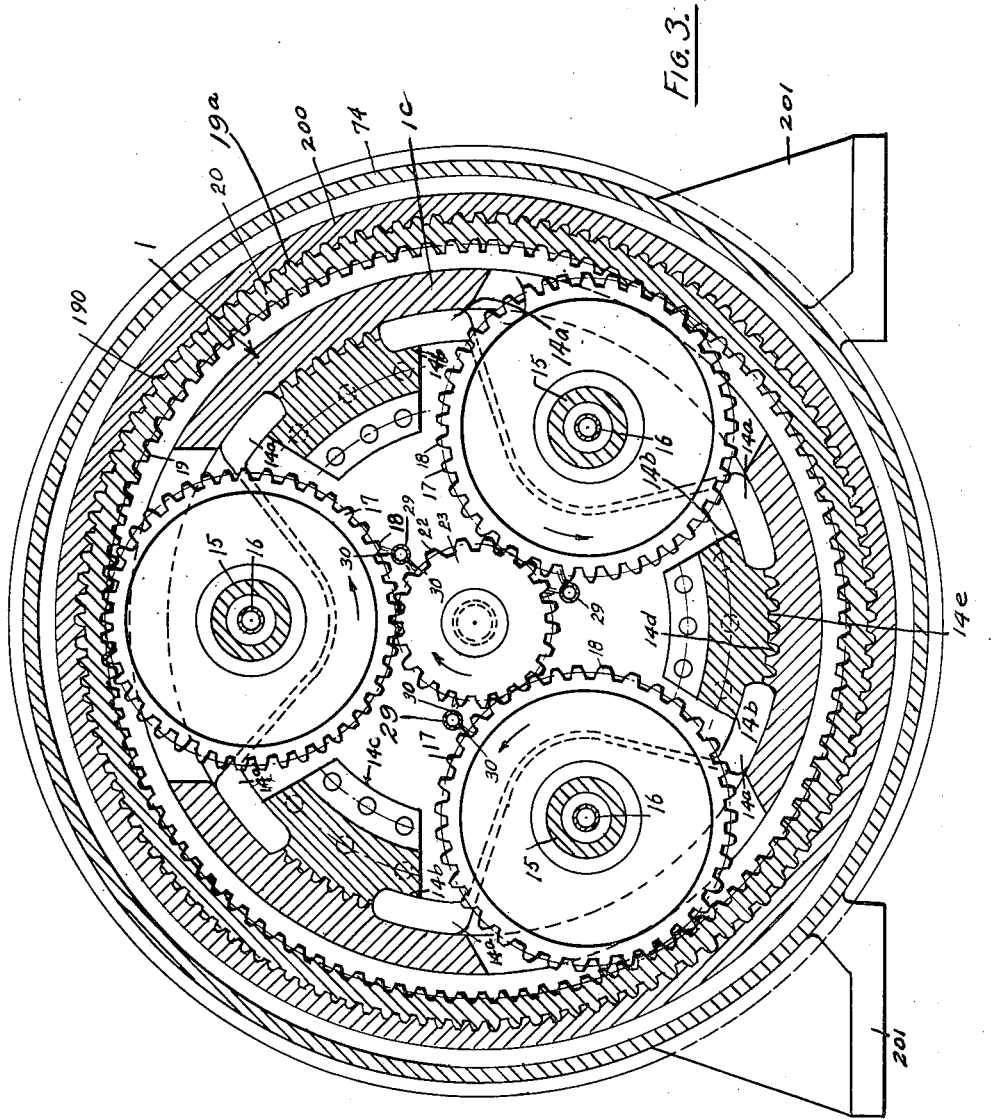
INVENTOR.
Paul Edward Pontius
Robert H. Shenk
BY
Charles L. Lovercheck
Atty.

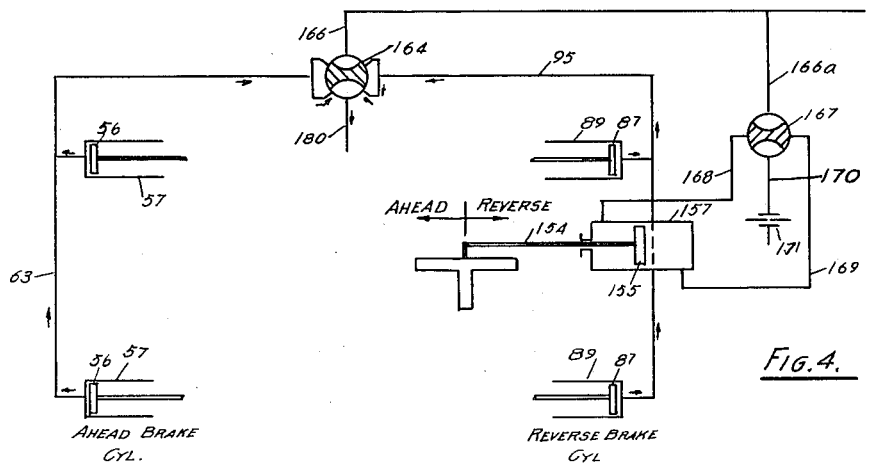
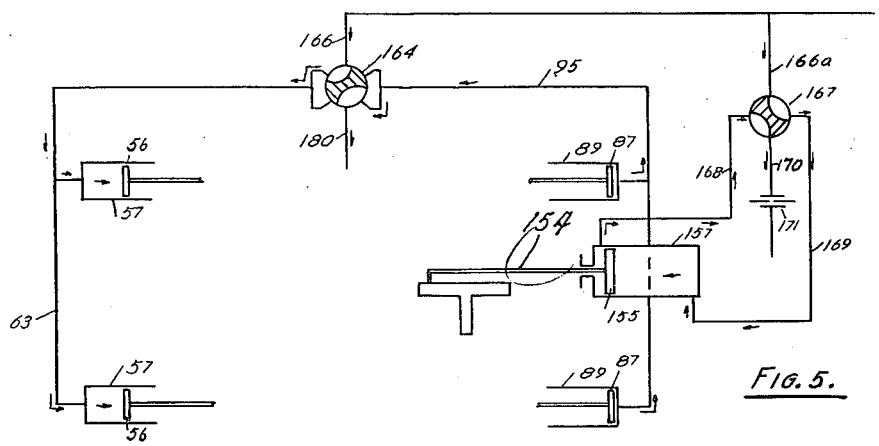
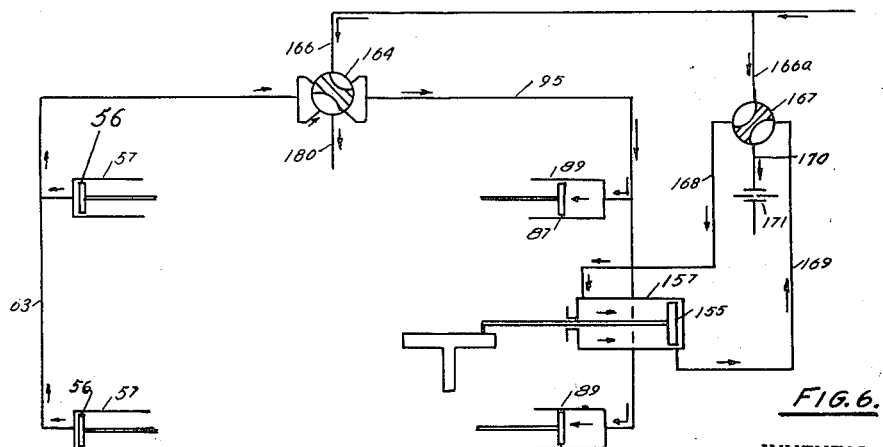

Nov. 27, 1956  R. H. SHENK ET AL  2,771,794
REVERSIBLE REDUCTION TRANSMISSION
Filed Nov. 20, 1952  5 Sheets-Sheet 5

INVENTOR.
Paul Edward Pontius
Robert H. Shenk
BY
Charles L. Lovercheck
atty

United States Patent Office 2,771,794
Patented Nov. 27, 1956

2,771,794
REVERSIBLE REDUCTION TRANSMISSION

Robert H. Shenk, State College, and Paul Edward Pontius, Erie, Pa., assignors to American Flexible Coupling Company, Erie, Pa., a corporation of Pennsylvania Application November 20, 1952, Serial No. 321,612

13 Claims. (Cl. 74—764)

This invention relates generally to transmission devices and more particularly to a reverse reduction transmission of the planetary type or a planetary reverse reduction gear.

In designing planetary gearing, it is necessary that the transmission be slip free, that the planetary gears be so designed that there will automatically be an equal load distribution between the various power paths, that is, between the planets, and lateral forces at the gear meshes balance to keep the mass of the bearings and support structure at a minimum.

Present planetary gear arrangements lack rigidity and bearing loads are high. The reason for high bearing loads in some of the previous reverse reduction gears is that there are no internal ring gears. Also, the length of the planet journals to accommodate clustered planet gears, such as in early Ford automobile transmissions, makes it difficult to design a sufficiently rigid carrier. There is little balance in these prior transmissions, further resulting in heavy bearing loads. In present planetary transmissions, the full output torque is carried by a sun gear, thereby requiring a comparatively large sun gear. The whole unit, is, therefore, necessarily larger than would be the case if the sun gear carried the input torque. These prior planetary reverse reduction gears require added gear meshes, thereby reducing the efficiency of the unit. They are also complicated and there are frequent breakdowns.

It is, accordingly, an object of our invention to overcome the above and other defects in present planetary reverse reduction gearing and it is more particularly an object of our invention to provide a planetary reverse reduction gearing which is simple in construction, economical in cost, economical in manufacture, and efficient in operation.

Another object of our invention is to provide slip free transmission of power in a forward or in a reverse direction in a planetary reverse reduction gear, with means for changing from one to the other in a minimum of time.

Another object of our invention is to provide a planetary reverse reduction gear which may be reversed in a minimum of time and which will withstand a maximum number of quick emergency reversals.

Another object of our invention is to provide a planetary reverse reduction gear having a minimum noise emission.

Another object of our invention is to provide a planetary reverse reduction gear having multiple power paths to minimize the size of the gear components and being so arranged that the lateral forces at the gear meshes will be well balanced so as to keep the mass of the bearings and support structure to a minimum.

Another object of our invention is to equalize the loads between the power paths in a planetary reverse reduction gear.

Another object of our invention is to provide a ring to operate brake disks in a planetary reverse reduction gear.

Another object of our invention is to provide a novel lubricating system for a planetary reverse reduction gear.

Another object of our invention is to provide a lubrication system for a planetary reverse reduction gear which supplies a lubricant on the working faces of the gear teeth at all times.

Another object of our invention is to provide a planetary reverse reduction gear having a minimum of weight and bulk.

Another object of our invention is to provide a novel planetary reverse reduction gear in which the driving engine does not have to be reversed, thereby permitting the use of a non-reversible gas turbine.

Another object of our invention is to provide a planetary reverse reduction gear which has substantially an equal amount of power ahead or astern.

Another object of our invention is to provide novel supports for a planetary reverse reduction gear with the casing surrounding the unit being only a shell which provides no support whatsoever.

Another object of our invention is to provide a novel ring coupling between a ring gear and the planet gears of a planetary transmission to minimize stresses from misalignment.

Another object of our invention is to provide a reversible transmission having a planetary gear unit, a double acting clutch, braking members, and other associated elements in a novel combination and arrangement.

Other objects of our invention will become evident from the following detailed description, taken in conjunction with the accompanying drawings, in which Fig. 1 is an end elevational view of the power output end of our novel planetary reverse reduction gear unit;

Fig. 3 is a vertical sectional view through the planets and supports therefor shown in Fig. 2;

Fig. 4 is a schematic view of an hydraulic system in a neutral position for use with our novel planetary reverse reduction unit;

Fig. 5 is a schematic view of the hydraulic control system shown in Fig. 4 in an ahead drive position;

Fig. 6 is a schematic view of the hydraulic control system shown in Fig. 4 in an astern drive position;

Figure 1:
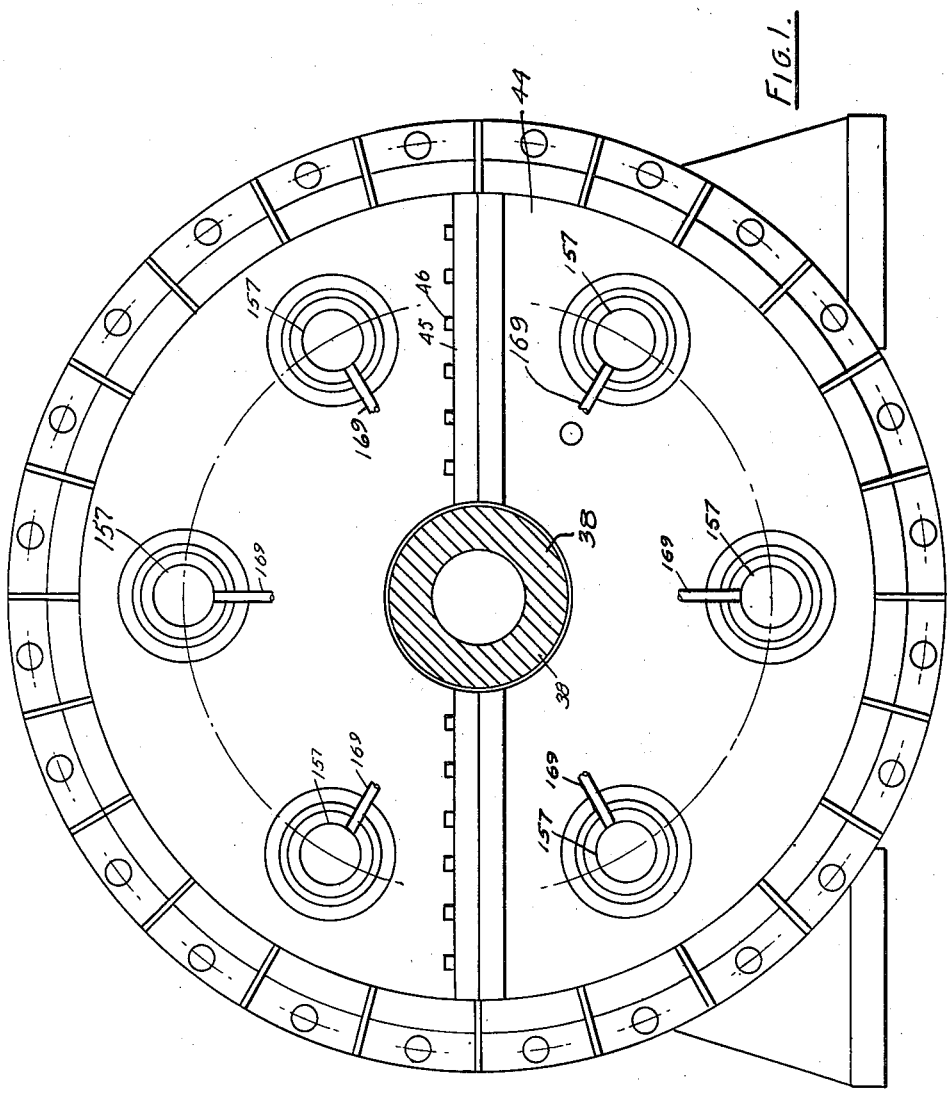
Figure 2:
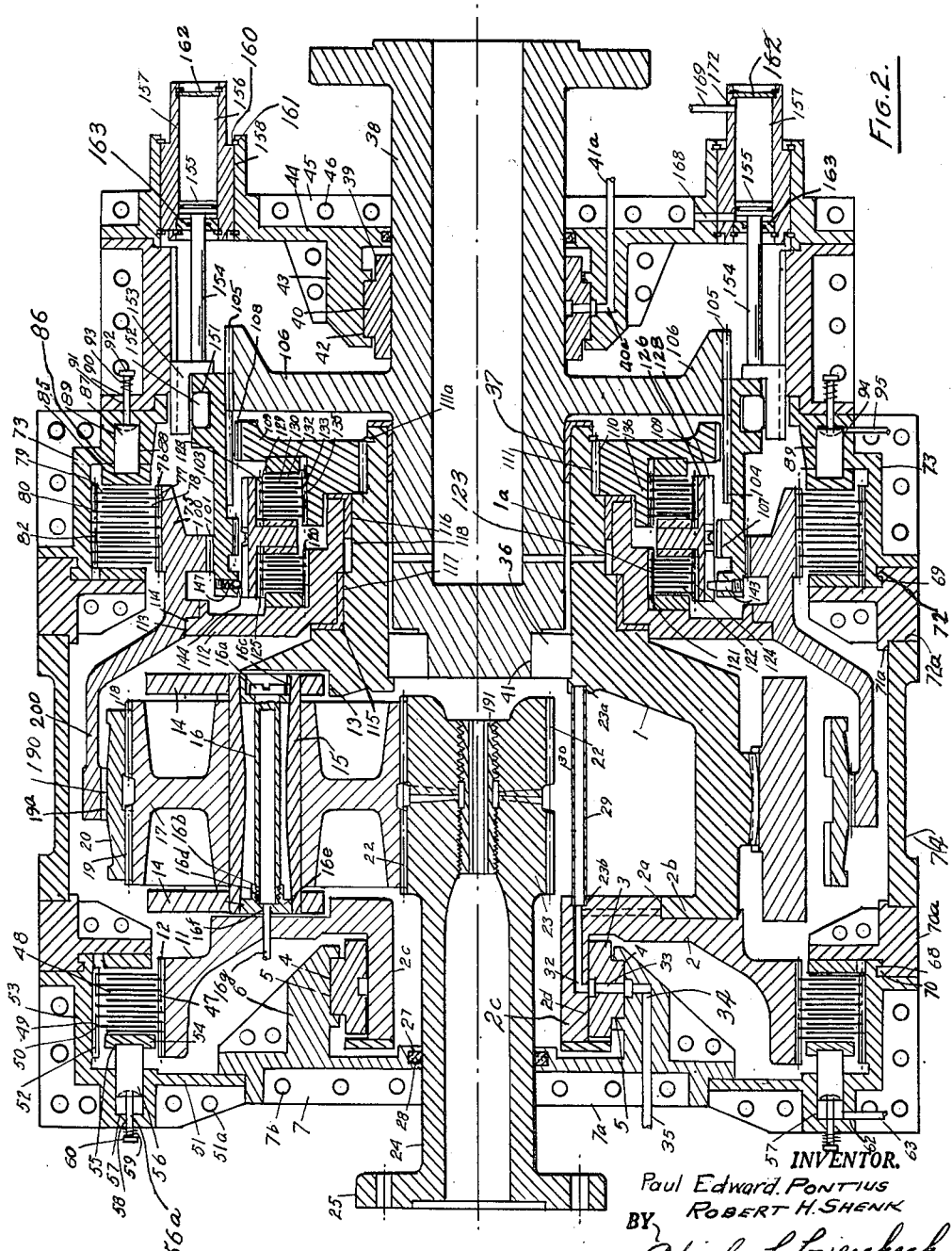
Fig. 2 is a longitudinally extending vertical sectional view of our novel planetary reverse reduction unit showing the relation of the parts in an ahead drive position.

Referring now to the drawings, we show in Figs. 1, 2, and 3 a rigid planet carrier 1 with an annular, outwardly extending mating half 2 having a nesting groove 2a nesting the portion 2b of the carrier 1. The mating half 2 has a hub 2c with a peripheral groove 2d for receiving an annular bearing member 3 having a radially outwardly extending portion 4 nested in a groove 5 in a supporting end member 6 consisting of mating halves 7 having flanged portions 7a secured together by bolt and nut assemblies 7b. The mating halves 7 have formed therein an annular washer groove 27 having an annular washer 28 sealingly engaging a floating input shaft 24 with a flange 25 adapted to be connected to any suitable prime mover. The mating half 2 of the planet carrier 1 has an angularly outwardly extending portion 11 with an annular face parallel to the axis of the planet carrier 1 and having gear teeth 12. The planet carrier 1 also has cutaway portions 13 nesting support members 14 having outwardly extending portions 14a nested in recesses 14b between a support member 14c and the inner side of the outer portion 1c of the planet carrier 1. The support member 14c has teeth 14d on radially extending portions thereof meshing with teeth 14e on the inner periphery of the outer portion 1c of the planet carrier 1. The support members 14 carry hollow shafts 15. Each of the hollow shafts 15 has an axially extending tubular member 16 having a head 16a on one end and a threaded portion 16b on the opposite end thereof. The headed end 16a is supported by a flanged member 16c mounted in one end of the hollow shafts 15 and the threaded end 16b is threadably engaged with the threaded portion 16d of a flanged member 16e mounted in the opposite end of the shafts 15. The flanged member 16e has an axially extending aperture 16f connected with a pipe 16g for lubricating purposes. Planet gears 17 are mounted on the shafts 15. The teeth 18 of the planet gears 17 mesh with internal teeth 19 of an annular ring gear coupling 20 and teeth 22 of a sun gear 23 disposed on the inner end of the input shaft 24, the teeth on the planets 17, coupling 20, and sun gear being of the herringbone type. The ring gear coupling 20 has outwardly extending teeth 19a meshing with internal teeth 190 on a ring gear 200. Lubricating pipes 29 having laterally extending apertures 30 providing nozzles directed toward the working faces of the teeth 22 of the sun gear 23 and the working faces of the teeth 19 of the planet gears 17 are supported in recesses 23a and 23b in the planet carrier 1 and the mating half 2, respectively, and they are in fluid flow relationship with apertures 32 in the hub 2c of the mating half 2 of the planet carrier 1 and the apertures 32, in turn, and in fluid flow relationship with an aperture 33 in the bearing member 3 and an aperture 34 in the end support member 6 for connection to a pipe line 35 leading to a source of lubricant under pressure. An adequate lubricant is supplied to the working faces of the teeth 19 and 22 at all times.

It will be noted that the planet carrier 1 is piloted on the input end thereof by the bearing member 3 which is a combination radial and two direction thrust bearing. The stepped hub 1a of the carrier 1 is piloted by two axially spaced pilot bearings 36 and 37 surrounding and engaging an output shaft 38, the pilot bearing 36 nesting in an annular groove 41 on the inner end of the output shaft 38. The output shaft 38 is supported and journalled in a combination radial and two direction thrusts bearing member 39 having a radially projecting portion 40 nesting in an annular groove 42 in outwardly projecting supporting portions 43 on an end member 44. The end member 44 is split and has outwardly projecting, apertured, flanged portions 45 connected together by bolt and nut assemblies 46. The thrust bearing 39 is lubricated through aperture 40a and pipe 41a leading to source of lubricant under pressure.

The teeth 12 on the mating half 2 of the planet carrier 1 mesh with the teeth 47 of rotatable and axially movable disks 48 in frictional engagement with axially movable disks 49 having teeth 50 on the outer periphery thereof meshing with splines 52 on the interior of the flanged portion 53 of the annular housing member 51 secured together by bolt and nut assemblies 51a. The disks 49 are held against rotation. A pressure ring 54 engages the outer of the disks 49 and it has an annular groove 55 engaged by spring-urged pistons 56, the pistons 56 being reciprocable in open, cup-shaped, cylindrical members 57 circumferentially spaced around the housing member 51 and formed integral therewith. The pistons 56 each have a shaft 56a with a head 60 extending axially outwardly therefrom and through apertures 58 in the ends of the cylindrical members 57. Coil springs 59 surround the portion of the shafts 56a outside of the cylindrical members 57 and engage the heads 60 on the ends thereof and the outer sides of the cylindrical members 57 to urge the pistons 56 away from the pressure ring 54, thereby taking the disks 48 and 49 out of frictional engagement. Each of the cylindrical members 57 has an aperture 62 leading thereto which is connected to pipe lines 63 which in turn are connected to a source of fluid under pressure whereby the pistons 56 are moved selectively by hydraulic pressure, thereby forcing the pressure ring 54 axially against the disks 48 and 49 whereby they frictionally engage and lock the planet carrier 1 and its mating half 2 against rotation.

The housing member 51 on the input end and housing member 73 on the output end of our novel unit have interlocking flanged portions 68 and 69, respectively, for lockingly engaging flanged interlocking portions 70 and 72 on an annular intermediate housing 70a. The intermediate housing 70a has an annular opening 72a with inwardly directed flanges 71a for receiving a removable cover 74. The opening 72a provides an entrance to the planet gear unit. Legs 201 support the housing 70a.

The ring gear 200 has an offset portion 75 with teeth 76 on the outer periphery thereof for engaging teeth 77 of axially movable, rotatable annular disks 78 which frictionally engage annular, axially movable friction disks 79 having teeth 80 meshing with splines 82 on the inner periphery of the flanged portion of the output end housing 73 to hold the disks 79 against rotation. An annular pressure ring 85 urges the disks 78 and 79 axially into frictional engagement to lock the mated ring gears 20 and 200 against rotation. The pressure ring 85 has an annular groove 86 engaged by pistons 87 reciprocable in cylindrical recesses 88 in the open cylindrical members 89 of the output end housing 73. The pistons 87 have axially, outwardly extending shafts 90 with heads 92 on the outer end thereof, the shafts 90 extending outwardly of the cylindrical members 89 through apertures 91. Coil springs 93 surround the shafts 90 outside of the cylindrical members 89 and are disposed between the heads 92 on the outer ends of the shafts 90 and the outer sides of the cylindrical members 89 formed integral with the housing 73 to urge the pistons 87 away from the pressure ring 85 to free the disks 78 and 79 from frictional engagement. The cylindrical members 89 have apertures 94 in fluid flow relationship with pipes 95 which provide fluid under pressure to selectively move the pistons 87 in the recesses 88 and force the pressure ring 85 against the disks 78 and 79 to lock the mated ring gears 20 and 200 against rotation.

Figure 7:
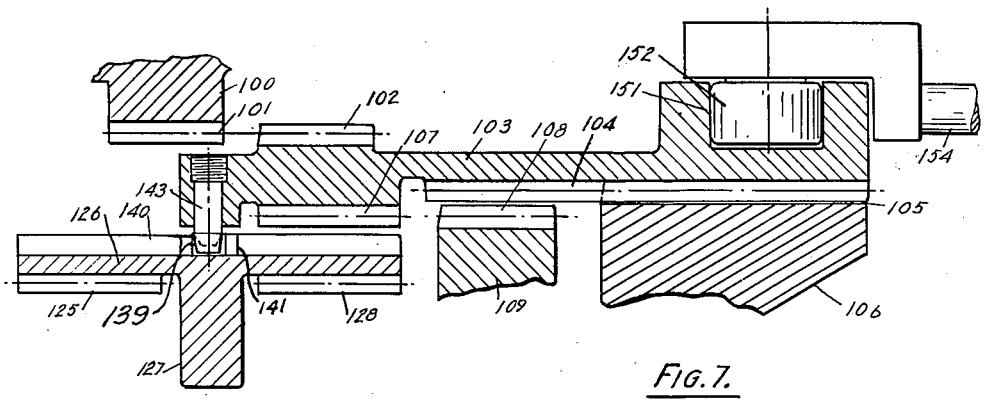
Fig. 7 is an enlarged fragmentary sectional view showing the synchronizing members and clutches used in our novel planetary reverse reduction gear unit.
Figure 9:
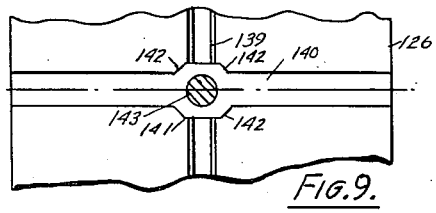
Fig. 9 shows the balking pin in a neutral position in the longitudinally extending synchronizing grooves in the yoke.

The offset portion 75 of the ring gear 200 also has an inwardly directed flange 100 with gear teeth 101 meshing with teeth 102 on the periphery of a shifting sleeve 103. The shifting sleeve 103 (Fig. 7) has longitudinally extending, internal splines 104 meshing with teeth 105 on a gear 106 integral with the output shaft 38. The shifting sleeve 103 also has internal teeth 107 longitudinally movable therewith to mesh with teeth 108 on a gear 109. The gear 109 has internal teeth 110 meshing with teeth 111 on the stepped hub 1a of the planet carrier 1. The gear 109 is held against a shoulder on the stepped hub 1a by a spring clip 111a. A right angled stepped member 112 has the outer end 113 thereof nesting in an annular groove 114 in the ring gear 200. The stepped member 112 is mounted on annular, angular bearing members 115 and 116 which are in turn mounted on the stepped portions 117 and 118 of the hub 1a of the planet carrier 1. The stepped member 112 has external teeth 120 meshing with internal teeth 121 on axially slidable disks 122, the axially slidable disks 122 being in frictional engagement with disks 123 having external teeth 124 on the periphery thereof engageable with splines 125 on one side of the inner periphery of a clutch member 126. The clutch member 126 has a centrally disposed pressure ring 127. On the side of the pressure ring 127 opposite the splines 125 on the clutch member 126, the clutch member 126 has splines 128 for engaging external teeth 129 on the outer periphery of axially movable disks 130 frictionally engageable with annular disks 132 having internal teeth 133 on the periphery thereof meshing with teeth 135 on the inner periphery of a projecting portion 136 of the gear 109.

Figure 8:
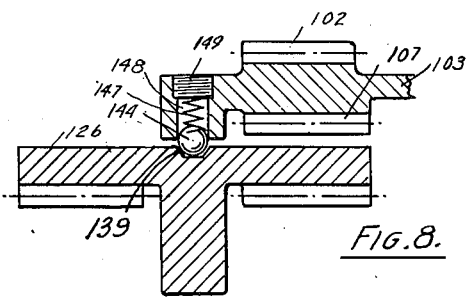
Fig. 8 is an enlarged fragmentary sectional view showing the ball and ball groove for holding the yoke in our novel transmission in a predetermined position.

The clutch member 126 has a peripheral groove 139 and transverse, circumferentially spaced grooves 140 (Figs. 9 to 13 inclusive) enlarged intermediate thereof at 141 and having tapered shoulders 142. A balking pin 143 is carried by the shifting sleeve 103 and the lower end thereof extends into and is slidable in the enlarged portion 141 of the grooves 140 and is also slidable in the grooves 140. A ball 144 (Fig. 8) is urged into the groove 139 on the periphery of the clutch member 126 by a spring 147 secured in an aperture 148 in the end of the shifting sleeve 103 by a threaded cap 149. The balking pins 143 and balls 144 are alternately disposed around the periphery of the clutch member 126 in spaced relationship. The offset portion 75 of the ring gear 200 and the stepped member 112 form a cage rotatable with the ring gear 200.

The shifting sleeve 103 has a peripheral groove 151 on the output end thereof for receiving rollers 152 mounted for rotation on the offset ends 153 of shifting arms 154. The shifting arms 154 have pistons 155 on the ends thereof movable in the bores 156 of cylindrical members 157 disposed in apertures 158 in the end 44 and held in the circumferentially spaced apertures 158 by locking clips 160 disposed in clip grooves 161. The cylindrical members 157 have apertures 172 of predetermined size for connection to hydraulic pipe lines 168 and 169 for moving the pistons 155 and operating the arms 154 and the shifting sleeve 103. The head end of the cylinders 157 are sealed by disks 162 and the opposite ends are sealed by washers 163 in sealing engagement with the shifting arms or rods 154.

In Figs. 4, 5, and 6, we show schematically, for illustration only, a hydraulic system which may be used to operate the hydraulic cylinders and pistons in our novel transmission. Pipe lines 63 are connected to the ahead brake cylinders 57 and to one side of a valve 164. The other side of the valve 164 is connected to pipe lines 95 which in turn are connected to the reverse brake cylinders 89. The valve 164 also has a pipe line 166 connected thereto which in turn is connected to a source of fluid. Pipe line 166a leads from pipe line 166 to a valve 167 connected by pipe lines 168 and 169 to opposite ends of synchronizing cylinders 157. The valve 167 is also connected through pipe line 170 to a flow control device 171. Pistons 155 reciprocate in the cylinders 157 to operate the shifting rods 154 connected thereto. An exhaust pipe 180 is also connected to the valve 164. Fig. 4 shows the hydraulic system in a neutral position. Fig. 5 shows the hydraulic system in a position for ahead drive with the valve 164 rotated to pass fluid under pressure from the pipe line 166 to the ahead brake cylinders 57 through the pipe lines 63. The valve 164 also opens the pipe lines 95 leading to the reverse brake cylinders 89 to the exhaust line 180 whereby the fluid in the reverse brake cylinders 89 is exhausted through the exhaust pipe 180. In the ahead drive, the fluid also flows through the pipe line 166a to the valve 167 and thence to the reverse brake cylinders through pipe lines 169, the cylinders 89, pipe lines 168, valve 167, and to the flow control device 171.

In the astern drive as shown in Fig. 6, a fluid is passed from the pipe line 166 through the valve 164 and pipe lines 95 to the reverse brake cylinders 89. The fluid is now exhausted from the ahead brake cylinders 57 through the pipe lines 63, valve 164, and exhaust pipe 180. The flow through the valve 167 is reverse to that shown in Fig. 5 in that the fluid flows through the pipe 166a, valve 167, pipe line 168, control cylinders 157, pipe lines 169, valve 167 to the flow control device 171.

Our multiple disk type brakes and clutches are of the wet type because the great flexibility of alignment and surface area per unit of space required is minimized. Conventional cooling of the braking surfaces may be provided if this is necessary. The use of wet type brakes and clutches operating in lubricating oil used in the reduction gear offers the simplest practical means for cooling. The use of wet brakes and clutches also eliminates the need for sealing them off which greatly simplifies the design. The deflection of the planet carrier is cancelled out by means of a swivel or spider type of design so as to apply the torque midpoint of its length when at one end.

Our novel transmission incorporates a rigid planet carrier spider pilotable at the input end by a combination radial and two direction thrust bearing and at the output end by two axially spaced pilot bearings on the output shaft which in turn is supported by a bearing at the output end in the case. The bearing at the output end is also a combination radial and two direction thrust bearing supported by the case. The planet gears 17 are so flexibly supported that their alignment is not affected by any torsional deflection of the torque transmitting planet carrier spider or mating half 2.

The spider or mating half 2 of the planet carrier 1 has ahead brake friction disk teeth for engaging the brake disk teeth and the hub 1a of the planet carrier 1 has a gear 109 attached by a splined connection carrying the astern synchronizing clutch friction disk teeth and the astern gear clutch teeth.

To minimize the effect of end restraint on the radial deflection of the ring gear 200 and to better support its weight, a spline coupling 20 is disposed midway of the length of the ring gear 200 rather than at the end.

The member 112 supporting the ring gear 200 and controlling its motion is piloted by the two axially spaced bearings 115 and 116 on the stepped hub 1a of the planet carrier 1. The member 112 has the ahead synchronizing clutch friction disk teeth 120 and also the gear clutch teeth 111 for the ahead direction. The offset portion 75 of the ring gear 200 has the astern brake friction disk teeth 76.

The sun gear 23 and the input shaft 24 are made completely free floating without supporting bearings to localize the load path through the planetary gear unit. So as to avoid the splitting of the ring gear 200, which would make it much more rigid and would complicate the application of the spline coupling 20 at the midpoint of its length, the sun gear 23 is split for assembly and fastened together by means of a face gear coupling held together axially by the use of a differentially threaded stud 191.

Lubrication is provided for the planetary gear unit by means of the pipes 29 and apertures 30 therein which present a spray of oil at the exits of the meshes between the teeth of the sun gear 23 and planet gears 17 providing adequate lubrication of the gear meshes. The lubrication spray from the pipes 29 is directed at all times on the working faces of the teeth of the sun gear 23 and the planet gears 17 as they come out of mesh, regardless of the direction of rotation of the output shaft 38. The maximum amount of cooling oil is thus directed to the active engaging surfaces of the meshing teeth of the sun gear 23 and the planet gears 17. Oil will be supplied to the brake disks and the friction disks of the synchronizing clutch so as to flow through these members outwardly radially in sufficient quantities to keep the friction disks apart when in their released condition to eliminate as much drag as possible and provide adequate flow through properly designed grooves in the disks for cooling during slipping application of these members.

The shifting sleeve 103 has external teeth 102 which engage the teeth 101 on the ring gear 200 for ahead drive and internal teeth 107 which engage the teeth 108 of the clutch gear 109 attached to the planet carrier spider or hub 1a for astern drive. The splines 104 on the shifting sleeve 103 are always engaged with the teeth 105 of the gear 106 integral with the output shaft 38. The sleeve 103 carries inwardly projecting blocking pins 143 which are slidable in the cam grooves 140 in the periphery of the clutch member 126 for synchronizing. The shifting sleeve 103 is actuated by an equal number of hydraulic cylinders 157 in the output end ring or housing 44 so arranged as to provide a balanced axial force at the sleeve 103. This force is applied through the hydraulic cylinder thrust rods 154 which have right angled ends 153 which carry needle bearing rollers 152 functioning between flanges on the periphery of the sleeve 103. The ends 153 act as guides so as to keep the rods 154 in alignment and take the circumferential force developed by the application of the axial force. The drawing shows six actuating cylinders 157; however, the number used is dependent upon the hydraulic pressure desired for operating the clutch. The forces required for synchronizing are not excessively high.

Axial thrust of the synchronizing clutch is taken in both directions by the planet carrier spider or hub 1a through thrust bearings 115 and 116. This thrust in turn is transmitted through the spider or hub 1a to the bearing 3 at the input end of the unit.

Because of the high axial forces required to operate the brakes, our transmission incorporates a frame which carries the hydraulic actuating mechanism, the mounting feet for the unit, and the friction disk engaging gear teeth, and is coupled axially to a reaction ring or housing also forming a part of the case by a shear connection. This serves to confine the axial operating force and the reaction torque of the brakes to rigid high strength members, allowing the balance of the housing to be relatively light. By providing hydraulic cylinders to actuate the brakes, a maximum of cylinder area is provided, thus keeping the hydraulic pressure to a minimum.

In the operation of our novel transmission for ahead operation, the power is first turned on to rotate the input shaft 24 in a clockwise direction. The shifting sleeve 103 is then moved toward the input end of the unit to actuate the clutch. The ahead brakes 57 are actuated to hold the planet carrier 1 in a stationary position and the pressure on the reverse brake cylinder 89 is released, thereby freeing the ring gear 200. Rotative force is then transferred from the sun gear 23 to the stationary, firmly held planets 17, ring gear coupling 20, ring gear 200, the shifting sleeve 103, and gear 106 on the output shaft 38. The rotation of the output shaft 38 will be opposite to that of the input shaft 24. When it is desired to rotate the output shaft 38 in the same direction as the input shaft 24, the reverse brake cylinders 89 are actuated to hold the ring gear 200 stationary while the ahead brake cylinders 57 are released, permitting rotation of the planet carrier 1 and planets 17. The double clutch is reversed through movement of the sleeve 103 and the thrust rods 154 connected thereto towards the output end of the unit. The teeth 107 on the shifting sleeve 103 then mesh with the teeth 108 on the gear 109 mounted on the cage or hub 1a of the planet carrier 1. Upon rotation of the input shaft 24, the planets 17 rotate around the sun gear 23 and move in the same direction of rotation, thereby rotating the planet carrier 1 and the gear 109 in the same direction. The gear 109 transfers rotative force to the shifting sleeve 103 which in turn transfers rotative force to the gear 106 on the output shaft 38 whereby it rotates in the same direction as the input shaft 24.

In shifting our novel transmission from ahead to reverse with the transmission in full power ahead, the power is first shut off, the ahead brakes are released, the double acting clutch is shifted disengaging the ahead clutch and engaging the reverse clutch. The power is turned on as needed, the reversing brake is locked, and full power in reverse is completed.

The reverse schedule from reverse to ahead is as follows: The power is first shut off and the reversing brakes are released. The double acting clutch is shifted disengaging the reversing clutch and engaging the ahead clutch, the forward brake is applied, and power is turned on as needed.

Figure 10:
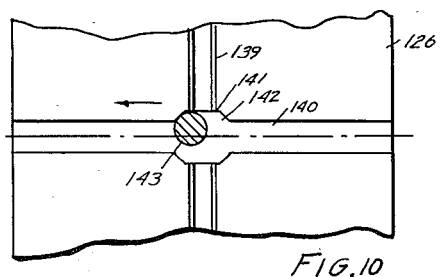
Figs. 10 and 11 are enlarged fragmentary views showing the balking pin in different positions in moving the clutch to an ahead position.
Figure 12:
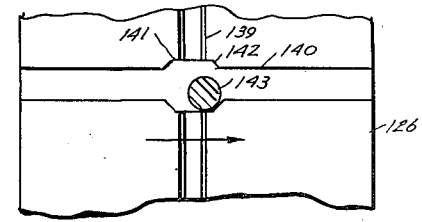
Figs. 12 and 13 are enlarged fragmentary views showing the balking pin movable in the synchronizing grooves to place the clutch in a reverse drive.
Figure 11:
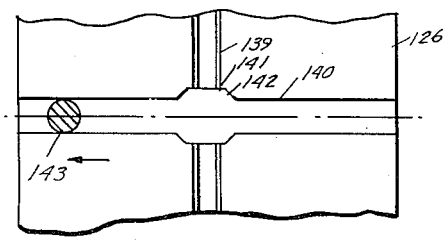
Figure 13:
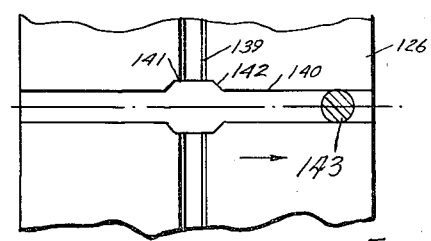

The double acting clutch is a synchronizing clutch. Spring-urged balls 144 are movable in the peripheral groove 139 on the clutch member 126 so as to maintain the clutch member 126 in a neutral position. When the shifting sleeve 103 is moved toward the output end of the unit, the balking pins 143 carried thereby engage camming portions or tapered shoulders 142 on opposite sides of the enlarged portion 141 of the transverse grooves 140 on the clutch sleeve 126 as shown in Fig. 10 until the teeth 107 mesh with the teeth 108 on the gear 109 whereby the balking pins 143 move along the groove 140 as shown in Fig. 11. When the shifting sleeve 103 is moved in a direction toward the input end of the unit, the balking pins 143 engage the camming portions 142 as shown in Fig. 12. The balking pins 143 move transversely of the grooves 140 as shown in Fig. 13 when the teeth 102 on the shifting sleeve 103 engage the teeth 111 on the offset portion 75.

It will be evident from the foregoing description that we have provided novel means for supporting a planetary reverse reduction transmission, novel lubricating means for the planetary unit of the transmission which provides oil on the working faces of the teeth of the sun gear 23 and planet gears 17 at all times, novel mounting means, which confines the axial operating force and the action of the brakes and the reaction torque of the brakes to rigid high strength members, one which has substantially equal power in a reverse or in a forward direction, and a novel arrangement of elements and parts including a novel synchronizing means in combination with the planetary unit.

Various changes may be made in the specific embodiment of our invention without departing from the spirit thereof or from the scope of the appended claims.

What we claim is:

1. A reversible planetary reduction gear comprising a floating sun gear, planet members mounted on a flexible mounting in meshing engagement therewith, a planet support for carrying said planet members included in said flexible mounting, a ring gear, an annular gear coupling having the teeth on the outer side thereof engageable with the internal teeth of said ring gear and the internal teeth thereof in meshing engagement with said planets, brake means for selectively stopping said planet carrier and said ring gear, an input shaft connected to said sun gear, an output shaft, and means for selectively connecting said output shaft to said ring gear and said planet carrier to transmit rotative force therebetween, said flexible mounting for said planet members comprising a cutaway portion nesting the planet support members, said planet support members having internal splined teeth engaging teeth on said cutaway portion.

2. In a planetary reversible reduction transmission having a planet gear carrier and a first ring gear driven from a drive shaft; comprising an output shaft and means to selectively connect said ring gear and carrier to said output shaft, said means comprising a first externally toothed member concentrically disposed on said output shaft and attached thereto, a hub disposed on said output shaft and journalled thereon, a second externally toothed member attached to said hub and disposed concentrically to said output shaft, an internally toothed member journalled on said hub concentric to said output shaft, said internally toothed member and said first and second externally toothed members having the teeth thereon axially spaced from each other, shiftable means to selectively operatively connect said first externally toothed member and said second externally toothed member together whereby said output shaft is diriven in a first direction relative to a given rotation of said output shaft, said shiftable means being shiftable to a second position disconnecting said first externally toothed member from said second externally toothed member and connecting said first externally toothed member to said internally toothed member whereby said output shaft is driven in an opposite direction from said first direction, synchronizing means on said shiftable means adapted to synchronize the relative speed of rotation of said first and second externally toothed members prior to engagement of said toothed members with said shiftable means, and means to synchronize the relative speed of said internally toothed member with said first externally toothed member and said shiftable means prior to engagement of said internally toothed member with said shiftable means.

3. The transmission recited in claim 2 wherein said shifting means comprises a shifting sleeve disposed concentrically to said output shaft, said shifting sleeve having externally toothed members disposed around the periphery thereof adjacent one end and engaging said internally toothed member, a first internally toothed member around the inner periphery of said shifting sleeve adjacent one end adapted to engage said second externally toothed member, and a second internally toothed member disposed around the inner periphery of said shifting sleeve adjacent the other end of said sleeve and engaging said first externally toothed member.

4. The transmission recited in claim 3 wherein the teeth of said second sleeve toothed member are spaced outwardly radially from the teeth of said first sleeve toothed member and said second externally toothed member is freely rotatable inside said second internally toothed sleeve member when said external sleeve toothed member engages said internally toothed hub member.

5. The transmission recited in claim 3 wherein said synchronizing means comprises a first clutch member attached to said second externally toothed member, a second clutch member attached to said internally toothed member, and a mating clutch member adapted to engage said first or said second clutch member, said mating clutch member being supported on a pressure ring, said pressure ring having a peripheral groove, circumferentially spaced grooves extending transversely of said peripheral groove, said transverse grooves having enlarged portions formed in said pressure ring where said transverse grooves intersect said peripheral groove, a balking pin carried by said shifting sleeve, said balking pin having an end extending into said spaced grooves, said balking pin adapted to be urged into engagement with the edges of said enlarged portions urging said mating clutch member to engage said one clutch member to frictionally connect said externally toothed member and said shifting sleeve, said balking pin being adapted to move out of engagement with said enlarged portions and to slide through said circumferentially spaced grooves when said first externally toothed member and said sleeve are operating at substantially the same speed, said balking pin adapted to move into the portion of said groove on the opposite side of said enlarged portions when said internally toothed member and said shifting sleeve are operated at the same speed.

6. The transmission recited in claim 3 wherein a second ring gear is attached to said internally toothed member by a member extending therefrom, said second ring gear having internal teeth and engaging external teeth on said first ring gear.

7. The transmission recited in claim 3 wherein a hydraulically actuated disk brake member is operatively connected between said internally toothed member and a member fixed to said transmission and another brake member is operatively connected between a fixed member and said planet carrier.

8. The reduction gear recited in claim 1 wherein said teeth on said planet support member are disposed in the path of rotation of said planet members.

9. In a reversible reduction transmission, a planetary gear train and a reversing assembly including synchronizing means comprising an input shaft extending into said transmission, a ring gear supported on said synchronizing means, toothed means adapted to connect said ring gear to said synchronizing means and operatively connected thereto, a spline coupling having external teeth and internal teeth, said external teeth engaging said ring gear, planetary gear means drivably connected to said input shaft, said internal teeth engaging said planetary gear means, said planetary gear means engaging said ring gear, and means for supporting said planetary gear means operatively connected to said synchronizing means, said planetary gear connecting means comprising toothed means adapted to connect said planetary support to said synchronizing means.

10. The transmission recited in claim 9 wherein said ring gear is made of two axially aligned parts connected together by means of an axially disposed differentially threaded screw.

11. The transmission recited in claim 9 wherein an output shaft is provided in axial alignment with said input shaft and said means for operatively connecting said planetary gear means to said synchronizing means comprises a carrier rotatably supported on said output shaft, external teeth on said carrier, and an internally toothed member attached to said planetary supporting means, said carrier external teeth engaging said teeth on said internally toothed member.

12. In a reversible reduction transmission, a planetary gear train and a reversing assembly including synchronizing means comprising an input shaft extending into said transmission, a ring gear supported on said synchronizing means, toothed means adapted to connect said ring gear to said synchronizing means and operatively connected thereto, planetary gear means drivably connected to said input shaft, means to operatively connect said ring gear to said planetary gear means, said planetary gear means engaging said ring gear, means for supporting said planetary gear means operatively connected to said synchronizing means, an output shaft in axial alignment with said input shaft, said means for operatively connecting said planetary gear means to said synchronizing means comprising a carrier rotatably supported on said output shaft, external teeth on said carrier, and an internally toothed member attached to said planetary supporting means, said carrier external teeth engaging said teeth on said internally toothed member, said planetary gear connecting means comprising toothed means adapted to connect said planetary support to said synchronizing means.

13. The transmission recited in claim 12 wherein said ring gear is supported on a member journalled on said carrier.

References Cited in the file of this patent

UNITED STATES PATENTS

| Number | Name | Date |
| --- | --- | --- |
| 773,414 | Osborn | Oct. 25, 1904 |
| 1,220,811 | Alquist | Mar. 27, 1917 |
| 1,299,156 | Fast | Apr. 1, 1919 |
| 1,396,821 | Drew et al. | Nov. 15, 1921 |
| 1,502,083 | Zoelly | July 22, 1924 |
| 1,520,625 | Wigley | Dec. 23, 1924 |
| 2,011,101 | Dodge | Aug. 13, 1935 |
| 2,175,857 | Simpson | Oct. 10, 1939 |
| 2,190,831 | Dodge | Feb. 20, 1940 |
| 2,242,515 | Dodge | May 20, 1941 |
| 2,460,629 | Fawick | Feb. 1, 1949 |
| 2,485,280 | Grace | Oct. 18, 1949 |
| 2,582,487 | Kelbel | Jan. 15, 1952 |
| 2,591,743 | Thompson | Apr. 8, 1952 |
| 2,599,559 | Kelbel | June 10, 1952 |
| 2,627,956 | Perkins | Feb. 10, 1953 |
| 2,651,394 | Sinclair | Sept. 8, 1953 |